United States Patent Office

3,033,815
Patented May 8, 1962

---

3,033,815
ORGANOSILICON COMPOUNDS AND PROCESS
FOR PRODUCING SAME
Ronald M. Pike, Chelmsford, Mass., and Edward L.
Morehouse, Snyder, N.Y., assignors to Union Carbide
Corporation, a corporation of New York
No Drawing. Filed Aug. 28, 1959, Ser. No. 836,623
36 Claims. (Cl. 260—46.5)

This invention relates in general to the synthesis of organosilicon compounds. More particularly, the invention is concerned with the production of organosilicon compounds, containing among other possible functional groups, a substituted amino group linked to the silicon atom or atoms thereof through an alkylene linkage of at least three carbon atoms and to such organosilicon compounds as new compositions of matter.

The present invention is based, in part, upon our discovery that organosilicon compounds containing a substituted amino group attached to the silicon atom thereof through an alkylene linkage of at least three carbon atoms can be produced by reacting an aminoalkyl silicon compound containing the grouping $H_2N(C_aH_{2a})Si\equiv$, wherein $a$ has a value of at least 3, and the amino group is removed by at least three (3) carbon atoms from the silicon atom with alpha-beta olefinically unsaturated organic compounds. The overall reaction can be graphically represented by the following equation which depicts for the purpose of illustration the reaction between an aminoalkyl silicon compound and acrylonitrile:

$NH_2(C_aH_{2a})Si\equiv + CH_2=CH-CN$
$\rightarrow \equiv Si(C_aH_{2a})NHCH_2-CH_2-CN$ Our process can be carried out by forming a mixture of the aminoalkyl silicon compound and an alpha-beta olefinically unsaturated organic compound under conditions which cause the starting materials to react. There results or is produced an organosilicon compound containing an organo-substituted amino group bonded to the silicon atom thereof through a polymethylene linkage of at least three carbon atoms by the addition of the grouping $-NH(C_aH_{2a})Si\equiv$ to the beta-olefinic carbon atom of the starting unsaturated organic compound and by the addition of hydrogen to the alpha-olefinic carbon atom thereof.

According to our studies the basic reaction is equally applicable to all organosilicon compounds containing the aminoalkylsilyl grouping depicted above. Most suitable for use in our process are the aminoalkylalkoxysilanes and the aminoalkylpolysiloxanes, including copolymeric materials which contain both aminoalkylsiloxane and hydrocarbon siloxane units. Typical of the aminoalkylalkoxysilanes which we can employ as our organosilicon starting materials are those compounds represented by the structural formula:

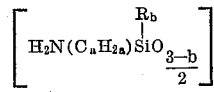

wherein R represents an alkyl group such as methyl, ethyl, propyl, butyl and the like, or an aryl group such as phenyl, naphthyl, tolyl and the like, Y represents an alkoxy group such as methoxy, ethoxy, propoxy and the like, $a$ is an integer having a value of at least 3 and preferably a value of from 3 to 4 and wherein the amino group is removed by at least three (3) carbon atoms from the silicon atom and $b$ is an integer having a value of from 0 to 2 and preferably a value of from 0 to 1. Illustrative of such aminoalkylalkoxysilanes are gamma-aminopropyltriethoxysilane, gamma-aminopropyltripropoxysilane, gamma-aminopropylmethyldiethoxysilane, gamma-aminopropylethyldiethoxysilane, gamma-aminoisobutyltriethoxysilane, gamma-aminoisobutylmethyldiethoxysilane, gamma-aminopropylphenyldiethoxysilane, delta-aminobutyltriethoxysilane, delta-aminobutylmethyldiethoxysilane, delta-aminobutylethyldiethoxysilane, delta-aminobutylphenyldiethoxysilane and the like.

Typical of the aminoalkylpolysiloxanes suitable for use as our organosilicon starting materials are those polysiloxanes which contain the structural unit:

wherein R, $a$ and $b$ have the same values described above and the amino group is removed by at least three (3) carbon atoms from silicon. Such polysiloxanes are prepared by the hydrolysis and condensation of those aminoalkylalkoxysilanes described above or by the co-hydrolysis and co-condensation of such aminoalkylalkoxysilanes with other hydrolyzable silanes and can include: aminoalkylpolysiloxanes of the trifunctional variety (i.e. where $b=0$), aminoalkylalkyl- and aminoalkylarylpolysiloxanes of the difunctional variety which include the cyclic or linear polysiloxanes (i.e. where $b=1$) and linear aminoalkyldialkyl-, aminoalkyldiaryl- and aminoalkylarylalkyldisiloxanes of the monofunctional variety (i.e. where $b=2$) as well as mixtures of compounds produced by the co-hydrolysis of difunctional, trifunctional and monofunctional aminoalkylsilanes.

Suitable starting aminoalkylpolysiloxanes of the trifunctional variety can be more specifically depicted as containing the structural unit:

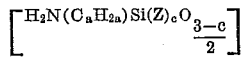

wherein $a$ has the value previously described and the amino group is removed by at least three (3) carbon atoms from silicon, Z represents an hydroxyl and/or alkoxy group and $c$ has an average value of from 0 to 1.0 and can be as high as 2, but is preferably from 0.1 to 1. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes in which Z is predominately alkoxy, can be prepared by the partial hydrolysis and complete condensation of the same starting silanes. On the other hand, aminoalkylpolysiloxanes in which Z is predominately hydroxyl, can be prepared by the essentially complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present in the starting silane and subsequently condensing the hydrolyzate so produced to the desired polymer.

Suitable starting aminoalkylpolysiloxanes of the difunctional variety which include the cyclic and linear polysiloxanes can be more specifically defined by the structural formula:

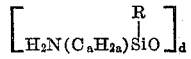

wherein R and $a$ have the values previously described and wherein the amino group is removed by at least three (3) carbon atoms from silicon and $d$ is an integer having a value of at least 3 and can be as high as 7 for the cyclic aminoalkylpolysiloxanes and higher for the linear aminoalkylpolysiloxanes. Such cyclic and linear aminoalkylpolysiloxanes can be prepared by the hydrolysis and condensation of aminoalkylalkyl- or aminoalkylaryldialkoxysilanes. In carrying out the hydrolysis and condensation procedures there is produced a product comprising a mixture of cyclic and linear polysiloxanes from which the desired polysiloxane can be recovered. Illustrative of the cyclic amionoalkylsiloxanes suitable for use as the organosilicon starting material in our process are the cyclic tetramer of gamma-aminopropylmethylsiloxane, the cyclic tetramer of delta-aminobutylphenylsiloxane and the like. Illustrative of suitable linear aminoalkylpolysiloxanes are gamma - aminopropylmethylpolysiloxane, gamma-aminopropylethylpolysiloxane, delta - aminobutylmethylpolysiloxane and the like.

Included among the useful starting linear aminoalkylpolysiloxanes are the alkyl, alkoxy and hydroxyl endblocked polysiloxanes which contain from 1 to 3 of such groups bonded to the terminal silicon atoms of the molecules comprising the polymeric chains. Thus we can also employ as our starting materials such linear end-blocked aminoalkylpolysiloxanes as monoethoxy end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkyl- and aminoalkylarylpolysiloxanes useful in our process can be prepared by the equilibration of cyclic aminoalkylsiloxanes with silicon compounds containing predominately silicon-bonded alkoxy groups, or by the co-hydrolysis and condensation of trialkylalkoxysilanes with aminoalkylalkyl- or aminoalkylaryldiethoxysilanes. Hydroxy end-blocked linear polysiloxanes can be prepared by heating linear or cyclic aminoalkylpolysiloxanes with water.

The copolymeric aminoalkylpolysiloxanes which can be employed as a starting material can be depicted as containing both the structural units:

$$\left[ H_2N(C_aH_{2a})\underset{R_b}{S}iO_{\frac{3-b}{2}} \right] \left[ R\underset{R_e'}{S}iO_{\frac{3-e}{2}} \right]$$

wherein R, a and b have the values described with the amino group removed by at least three carbon atoms from silicon, R' represents either an alkyl or aryl group as R, and e is an integer having a value of from 0 to 2. The copolymers suitable for use as the organosilicon starting material in our process can contain various combined siloxane units such as trifunctional aminoalkylsiloxane units (where $b=0$) with trifunctional alkyl-, aryl- or mixed alkyl- and arylsiloxane units (where $e=0$) or with difunctional alkyl-, aryl- or mixed alkyl- and arylsiloxane units (where $e=1$). These copolymers can also contain various combined siloxane units; difunctional aminoalkylsiloxane units (where $b=1$) with trifunctional alkyl- aryl- or mixed alkyl- and arylsiloxane units (where $e=0$) or with difunctional alkyl-, aryl- or mixed alkyl- and arylsiloxane units (where $e=1$).

Those copolymers which contain trifunctional aminoalkylsiloxane units and other siloxane units are preferably prepared by the co-hydrolysis and co-condensation of the corresponding alkoxysilane starting materials. Such copolymers can contain silicon-bonded alkoxy or hydroxyl groups or they can comprise essentially completely condensed materials. The linear and cyclic copolymeric siloxanes are prefreably prepared by the separate hydrolysis and condensation of an aminoalkylalkyldialkoxysilane or aminoalkylaryldialkoxysilane and the dialkyldialkoxysilane or diaryldialkoxysilane to cyclic aminoalkylsiloxanes and cyclic dialkylsiloxanes or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups.

The alpha-beta olefinically unsaturated organic compounds which we can employ as one of the starting materials in our process are those compounds which contain an organic functional group bonded to at least one of the olefinic carbon atoms thereof. Such compounds can be graphically depicted by the following formula:

wherein R'' represents either a hydrogen atom or an alkyl group, X represents an organic functional group such as a nitrile group or a substituted carbonyl group, as for example, one represented by the structure:

$$-\underset{\underset{O}{\|}}{C}-D$$

wherein D represents either hydrogen, or an alkyl, aryl, alkoxy, aryloxy or an amino group, and B represents either a hydrogen atom, an alkyl group, an aryl group or an organic functional group as X. Illustrative of the alpha-beta olefinically unsaturated organic compounds suitable for use in our process are: acrylonitrile, crotononitrile, methyl acrylate, ethyl acrylate, methyl methacrylate, acrylamide, ethyl cinnamate, diethyl maleate, methyl vinylketone and the like.

The olefinically unsaturated organic compound and the aminoalkyl silicon compound starting materials can be employed in amounts of from 1 to 3 chemical equivalents of the unsaturated compound (based on the olefine group) per chemical equivalent of the aminoalkyl silicon compound (based on the amino group). Preferably, we employ our starting materials in equal chemically equivalent amounts. However, amounts of our starting materials, other than that set forth above, can also be employed, although no commensurate advantage is obtained.

The reaction between an alpha-beta olefinically unsaturated organic compound and an aminoalkyl silicon compound is mildly exothermic and can be carried out at temperatures as low as 10° C. and at temperatures up to 150° C. and higher. In carrying out our process, we prefer to conduct the reaction at temperatures of from about 30° C. to about 80° C. The reaction can be carried out at temperatures outside of the range described above, however no apparent advantage is gained thereby.

Our process can be carried out by conducting the reaction between the starting materials within a liquid organic compound which is miscible therewith, but with which it is non-reactive. Suitable for use as solvents are: the aromatic hydrocarbons, such as benzene, toluene and the like, and the dialkyl ethers, such as diethyl ether, diisopropyl ether and the like. The amount of the liquid organic compounds which can be employed in our process is not narrowly critical and can vary over a wide range. We can employ from about 50 parts to about 200 parts of such compounds per 100 parts of the starting materials.

In the practice of the process of our invention we prefer to employ as our starting alpha-beta olefinically unsaturated organic materials those compounds which contain only one organic functional group bonded to either of the olefinic carbon atoms thereof. Furthermore, when the organic functional group bonded to an olefinic carbon atom of our starting materials is an aldehyde or ketone group we have found that a competing reaction occurs, namely that between such group and the amino group of our starting silicon compounds to yield a methylideneaminoalkyl silicon compound. In our process this side reaction is undesirable and can be limited by first inactivating the aldehyde or ketone group toward such reactions, by known procedures, conducting our reaction and subsequently recovering the aldehyde or ketone group, again by known procedures.

The monomeric compounds of our invention are substituted aminoalkylalkoxysilanes and can be graphically depicted by the formula:

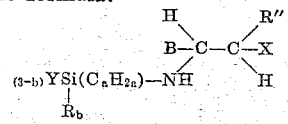

wherein R, R", X, B, Y, a and b have the values defined above. The monomeric compounds of our invention can also include the bis-substituted aminoalkylalkoxysilanes which have the graphic formula:

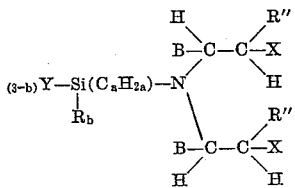

again wherein R, R", X, B, Y, a and b have the values defined above. Illustrative of such substituted aminoalkylalkoxysilanes are gamma-(N-2-carbomethoxyethyl) aminopropyltriethoxysilane, gamma - (N,N - di - 2-carbomethoxyethyl)aminopropyltriethoxysilane, gamma- (N - 2 - carbomethoxyethyl) - aminoisobutyltriethoxysilane, delta - (N - 2 - carbethoxyethyl)aminobutyltriethoxysilane, gamma - (N - 2 - amidoethyl)aminopropyltriethoxysilane, delta - (N - 2 - cyanoethyl)aminobutylmethyldiethoxysilane, delta - (N - 1 - phenyl - 2-carbethoxyethyl)aminobutylmethyldiethoxysilane, and the like.

The polymeric compounds of our invention, which can be prepared by the hydrolysis of the substituted aminoalkylalkoxysilanes described above or by the reaction of alpha-beta olefinically unsaturated organic compounds with aminoalkylpolysiloxanes have the structural units:

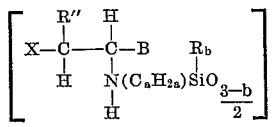

and

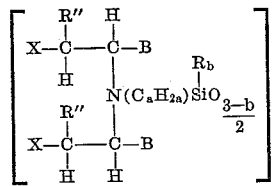

wherein R, R", X, B, a and b have the values defined above. Illustrative of such polysiloxanes are: gamma-(N - 2 - carbomethoxyethyl)aminopropylpolysiloxane, gamma - (N,N - di - 2 - carbomethoxyethyl)aminopropylpolysiloxane, gamma - (N,N - di - 2 - carbomethoxyethyl)aminoisobutylpolysiloxane, delta - (N - 2 - amidoethyl)aminobutylpolysiloxane, delta - (N - 2 - cyanoethyl)aminobutylpolysiloxane, the linear gamma-(N-2-carbomethoxyethyl)aminopropylmethylpolysiloxane as well as the cyclic tetramer thereof, the cyclic tetramer and pentamer of gamma-(N-2-cyanoethyl)aminopropylmethylsiloxane as well as the linear polymers thereof, the cyclic and linear delta-(N-1-phenyl-2-carbethoxyethyl)aminobutylphenylsiloxanes, the linear and cyclic gamma-(N-2-amidoethyl)-aminopropylethylsiloxanes and the like as well as the corresponding disiloxanes.

The copolymer compounds of our invention contain either of the polymeric units depicted immediately above and hydrocarbylpolysiloxane units. To illustrate, the mono-substituted aminoalkyl copolymeric siloxanes are represented by the units:

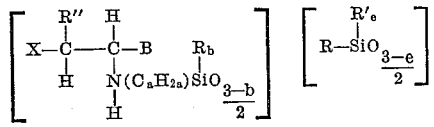

wherein R, R', R", X, B, a, b and e have the values defined above. Such copolymers include among others the gamma - (N - 2 - carbomethoxyethyl)aminopropylmethylsiloxane-, the delta-(N-2-amidoethyl)aminobutylethylsiloxane-, and the delta-(N-2-cyanoethyl)aminobutylphenylsiloxane-modified dimethylpolysiloxane oils.

In each of the new compounds of the present invention the secondary or tertiary amino nitrogen atom is removed by at least three (3) carbon atoms from the silicon atom.

The cyanoalkyl substituted aminoalkylalkoxysilanes and cyanoalkyl substituted aminoalkylpolysiloxanes of our invention find use as the starting materials in preparing aminoalkyl substituted aminoalkylalkoxysilanes and aminoalkyl substituted aminoalkylpolysiloxanes. Such is accomplished by reacting the cyanoalkyl substituted aminoalkyl silicon compounds with hydrogen, under a pressure of at least 500 p.s.i. The reaction can be conducted in the presence of ammonia and at a temperature of at least 50° C. and preferably at a temperature of from about 80° C. to about 120° C.

The stable members of the aminoalkyl-substituted aminoalkyl silicon compounds of our invention are the alkoxysilanes and the siloxane polymers and siloxane copolymers that contain the unit:

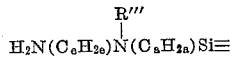

wherein a has the value described above, R''' preferably represents a hydrogen atom and can also represent an alkyl group or the unit $H_2N(C_eH_{2e})-$, the R''' substituted nitrogen atom is removed from silicon by at least three (3) carbon atoms, e is an integer having a value of at least two (2) and preferably a value of from two (2) to six (6), the primary amino group being removed by at least two (2) carbon atoms from the R''' substituted nitrogen atom and wherein at least one (1) free valence of silicon is connected to a member selected from the class consisting of alkoxy groups and silicon through silicon to oxygen to silicon linkage and any remaining unfilled valence of silicon is satisfied by a member of the class consisting of alkyl and aryl groups. Such compounds include the substituted mono-, di- and tri-functional alkoxysilanes as well as the polysiloxanes obtained by the hydrolysis and condensation of such alkoxysilanes alone or in combination with other hydrolyzable silanes, as for example, the hydrocarbon-substituted alkoxysilanes. Our preferred aminoalkyl-substituted aminoalkyl silicon compounds are the di- and tri-alkoxysilanes and their corresponding siloxane polymers and siloxane copolymers. The copolymeric polysiloxanes can be prepared either by co-hydrolysis and co-condensation reactions or they can be prepared by the equilibration of aminoalkyl-substituted aminoalkyl polysiloxanes with other polysiloxanes such as dimethylpolysiloxane with the aid of an alkaline equilibration catalyst.

It has been noted that aminoalkyl-substituted aminoalkylalkoxysilanes and polysiloxanes as well as the copolymeric polysiloxanes which are not characterized by the critical positioning of the amino groups are not stable compositions of matter nor are they as useful in the applications described below as the aminoalkyl-substituted aminoalkyl silicon compounds of our invention. By way of illustration, aminoalkyl-substituted aminoalkylalkoxysilanes and their polymers as well as copolymers, in which the primary and secondary or tertiary amino nitrogen atoms are connected to each other by only a methylene unit (—$CH_2$—) are unstable and decompose. On the other hand, aminoalkyl-substituted aminoalkylalkoxysilanes and their polymers as well as copolymers, in which the secondary or tertiary amino nitrogen atom is connected to silicon by an alkylene chain of less than three (3) carbon atoms, are also unstable and decompose.

While aminoalkyl-subsituted aminoalkyl silicon compounds within the above formula are prepared by the hydrogenation of cyanoalkyl-substituted aminoalkyl silicon compounds, they can also be prepared by other reactions employing the aminoalkyl silicon starting materials described in detail above. By way of illustration, gammaamino-propyltriethoxysilane is reacted with ethylene imine or trimethylene imine to yield gamma(N-2-aminoethyl)aminopropyltriethoxysilane or gamma(N-3-aminopropyl)aminopropyltriethoxysilane as the case may be. Such aminoalkyl-substituted aminoalkyl silicon compounds are also prepared by reacting a chloro-bromoalkane, other than one in which the halogen atoms are bonded to the same carbon atom, such as 1-chloro-2-bromoethane or 1-chloro-4-bromobutane with a starting aminoalkyl silicon compound such as delta-aminobutyltriethoxysilane in the presence of a hydrogen bromide acceptor and at a temperature of about 150° C. to produce either the delta(N-2-chloroethyl)aminobutyltriethoxysilane or the delta(N-4-chlorobutyl)aminobutyltriethoxysilane as the case may be and by subsequently reacting the chloroalkyl-substituted aminoalkyl silicon compounds with ammonia to produce the corresponding delta(N-2-aminoethyl)aminobutyltriethoxysilane or the delta(N-4-aminobutyl)aminobutyltriethoxysilane. The aminoalkyl-substituted aminoalkyl silicon compounds of the present invention can also be prepared by reacting equal molar amounts of an alkylenediamine in which the amino groups are bonded to different carbon atoms, as for example, ethylenediamine or hexamethylenediamine, with a chloro-substituted alkylalkoxysilane or polysiloxane in which the chlorine substituent on the alkyl group is removed by at least three (3) carbon atoms from the silicon atom, as for example, gamma-chloropropyltriethoxysilane or a copolymeric polysiloxane containing dimethylsiloxane units and polysiloxane containing dimethylsiloxane units and delta-chlorobutylmethylsiloxane units. The reaction can be carried out by forming a mixture of the alkylenediamine and chloroalkylalkoxysilane or polysiloxane and heating the mixture to a temperature sufficiently elevated to produce the aminoalkyl-substituted aminoalkyl silicon compound.

Representative of other aminoalkyl-substituted aminoalkyl silicon compounds are gamma-(N-2-aminoethyl)propylmethyldiethoxysilane, delta-(N-3-aminopropyl)isobutylmethyldiethoxysilane, gamma-(N-2-aminoethyl)isobutylmethyldiethoxysilane, epsilon-(N-6-aminohexyl)pentyltriethoxysilane as well as their hydrolysis and condensation products either alone or in combination with other hydrolyzable silanes. Such polysiloxanes can be either partially or completely condensed cross-linked materials or they can constitute linear or cyclic polymers depending on the functionality of the starting monomer or monomers and the extent to which hydrolysis and condensation is carried out.

Organosilicon compounds of our invention can also be defined as consisting of alkoxysilanes and siloxane polymers and siloxane copolymers containing at least one (1) unit of the formula:

$$H_2N(C_aH_{2a})Si\equiv$$

wherein $a$ is an integer having a value of at least 3 and wherein the nitrogen atom is removed from silicon by at least three (3) carbon atoms and wherein at least one (1) of the nitrogen-bonded hydrogen atoms is replaced by a beta-functional ethyl group selected from the class consisting of beta-cyanoethyl, beta-carbalkoxyethyl, beta-carbaryloxyethyl, beta-amidoethyl, beta-aminoethyl, beta-formylethyl

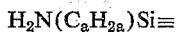

(HC—CH$_2$CH$_2$—)
   ‖
   O beta-alkylcarbonylethyl

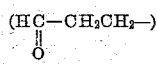

(alkyl-C—CH$_2$CH$_2$—)
   ‖
   O and beta-arylcarbonylethyl

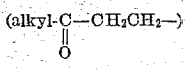

(aryl-C—CH$_2$CH$_2$—)
   ‖
   O and wherein the silicon atom of said unit is connected to at least one (1) member selected from the class consisting of alkoxy and silicon through a silicon to oxygen to silicon linkage and from 0 to 2 of the remaining valences of the silicon atom of said unit are satisfied by a member selected from the class consisting of alkyl and aryl groups.

The compounds of our invention, including the aminoalkyl substituted aminoalkyl silicon compounds, find use as sizes for fibrous materials, particularly fibrous glass materials employed in combination with thermosetting resins. The difunctional polysiloxanes find use as modifiers for dimethylpolysiloxane oils and gums while the monofunctional disiloxanes find use as chain end-blocking units for dimethylpolysiloxane oils. The trifunctional polysiloxanes find use themselves as thermosetting resins or they can be employed to modify the known methyl- and methylphenyl thermosetting resins, both types of which are employed as coatings. Our monomeric and polymeric compounds can also be employed as adhesives or as flocculation agents.

The aminoalkyl-substituted aminoalkyl silicon compounds are most useful as indicated above, as sizes for fibrous glass materials where it has been found that the softness or hand of glass cloth treated with such silanes is softer than that obtainable with other silane finishes. Moreover, such aminoalkyl-substituted aminoalkyl silicon compounds are more effective as chelating agents than the mono-aminoalkyl silicon compounds.

The following examples illustrate present invention.

EXAMPLE I

*Reaction of Gamma-Aminopropyltriethoxysilane With Methyl Acrylate*

To a 500 cc. flask equipped with a stirrer, thermometer and reflux condenser was charged 75.0 grams of gamma-aminopropyltriethoxysilane and 29.2 grams of methyl acrylate. The reaction mixture was heated to a temperature of 80° C., with constant stirring, under a pressure of 2.0 mm. of mercury; the resulting product (82.9 grams) had a refractive index at 25° C. of 1.4311 and a viscosity of 10 centipoises. The product was placed in a 250 cc. flask and distilled through a Vigreaux column under reduced pressure until 7.1 grams of a first fraction, with a boiling range from 55° C. (at 0.55 mm. of Hg) to 104° C. (at 0.38 mm. of Hg) and having refractive indices at 25° C. of 1.4187–1.4208 was collected. At a pressure of 0.33–0.38 mm. of Hg and a temperature of 109° C.–111° C., 61.4 grams of a second fraction was distilled over having a refractive index at 25° C. of 1.4308 which fraction was further identified as gamma-(N-2-carbomethoxyethyl)-aminopropyltriethoxysilane

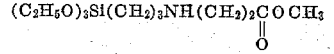

$(C_2H_5O)_3Si(CH_2)_3NH(CH_2)_2COCH_3$
                                    ‖
                                    O

Analysis for $C_{13}H_{29}NSiO_5$.—Calculated: C, 50.8; H, 9.5; N, 4.6; Si, 9.1. Found: C, 51.0; H, 9.7; N, 4.4; Si, 9.3.

The infrared spectrum confirmed the presence of —NH—, —CH$_3$—, —CH$_2$—,

O
        ‖
       —C— ester, —C—O—C-ester, ≡Si(CH$_2$)$_3$—, and

—C—NH—C-groups

Two higher boiling fractions were also obtained from the residue in the 250 cc. flask, namely (1) 6.8 grams having a boiling range from 130° C. (at 0.33 mm. of Hg) to 145° C. (at 0.30 mm. of Hg), refractive index at 25° C. of 1.4382, and (2) 3.6 grams having a boiling range from 145° C. (at 0.30 mm. of Hg) —167° C. (at .90 mm. of Hg), refractive index at 25° C. of 1.4388. Fraction (2) above was further identified as gamma-(N-N - di - 2 - carbomethoxyethyl)aminopropyltriethoxysilane, $(C_2H_5O)_3Si(CH_2)_3N(CH_2CH_2COOCH_3)_2$.

Analysis for $C_{17}H_{35}NSiO_7$.—Calculated: C, 51.9; H, 8.9; N, 3.1; Si, 7.1. Found: C, 51.5; H, 8.4; N, 3.5; Si, 7.4.

The infrared analysis confirmed the presence of bands due to $CH_3-$, $-CH_2-$

ester, $-C-O-C$-ester, $\equiv Si(CH_2)_3-$, and $\equiv SiOC_2H_5$ groups. No $-NH-$ or $-NH_2$ stretching frequency was observed.

EXAMPLE II

*Reaction of Gamma-Aminopropyltriethoxysilane With Ethyl Acrylate*

To the equipment described in Example I there were charged 100 grams of gamma-aminopropyltriethoxysilane and 100.1 grams of ethyl acrylate. The mixture was stirred for one hour during which time the temperature rose 17° C. The reaction mixture was then heated to 120° C. for a period of 2 hours. Various fractions of the reaction product were distilled through a Vigreaux column under reduced pressure. A first fraction having a boiling range from 64° C. (at 1.2 mm. of Hg) $-118°$ C. (at 1.4 mm. of Hg), $n_D{}^{25}=1.4179-1.4300$, amounted to 12 grams. At a temperature of 117° C.–121° C. and a pressure of 0.45 mm. of Hg, 92.2 grams of a second fraction, $$n_D{}^{25}=1.4302$$

was collected which fraction was further identified as gamma-(N-2-carbethoxyethyl)-aminopropyltriethoxysilane, $(C_2H_5O)_3Si(CH_2)_3NH(CH_2)_2COOC_2H_5$.

Analysis for $C_{14}H_{31}SiNO_5$.—Calculated: C, 52.3; H, 9.7; Si, 8.7; N, 4.4. Found: C, 51.9; H, 9.0; Si, 9.2; N, 4.4.

Infrared analysis confirmed the presence of bands due to $-NH-$,

ester, $-C-O-C-$ ester, and $\equiv SiOC_2H_5$ groups. No ethylenic unsaturation, i.e. $-C=C-$, bands were observed.

A third fraction amounting to 26.8 grams was obtained having a boiling range from 149° C. (at 0.4 mm. of Hg) $-166°$ C. (at 0.45 mm. of Hg), $n_D{}^{25}=1.4372-1.4379$. This fraction was further characterized as gamma-(N-,N-di-2-carbethoxyethyl)aminopropyltriethoxysilane,

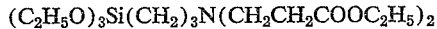

Analysis for $C_{19}H_{39}SiNO_7$.—Calculated: C, 54.2; H, 9.3; Si, 6.7; N, 3.3. Found: C, 54.2; H, 9.0; Si, 7.1; N, 3.3.

The infrared spectrum did not disclose absorption due to $-NH-$, $-NH_2$, or $-C=C-$ bonding.

EXAMPLE III

*Reaction of Gamma-Aminopropyltriethoxysilane With Acrylamide*

To the equipment utilized in the previous examples (I and II), there were charged 110.7 grams of gamma-aminopropyltriethoxysilane and 39.1 grams of acrylamide added in 5 gram increments with continous stirring of the reaction mixture. No temperature rise was observed. The mixture, i.e., slurry, was heated to 80° C. (at 56° C. the reaction mixture became homogeneous). The temperature of the resulting mixture was maintained at 80° C. for a period of 4 hours with continuous stirring. The reaction product was distilled through a Vigreaux column under reduced pressure until a fraction amounting to 49.5 grams was collected. The fraction distilled at 85° C.–192° C. under a pressure of 1.5–2.5 mm. of Hg; refractive index at 25° C. was 1.4448–1.4521. An analytical sample had a boiling range of 85° C.–160° C. under a pressure from 1.5–2.3 mm. of Hg; the refractive index at 25° C. was 1.4448.

Infrared analysis of this analytical sample confirmed the presence of bands due to the presence of gamma-(N-2-amidoethyl)aminopropyltriethoxysilane,

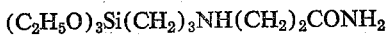

Analysis for $C_{12}H_{28}SiN_2O_4$.—Calculated: C, 49.4; H, 9.6; Si, 9.6; N, 9.6. Found: C, 49.3; H, 10.5; Si, 9.5; N, 9.6.

EXAMPLE IV

*Reaction of Gamma-Aminopropyltriethoxysilane With Acrylonitrile*

A 100 ml. flask was equipped with stirrer, dropping funnel, thermometer, and reflux condenser, and charged with 442.6 grams of gamma-aminopropyltriethoxysilane under a protective argon atmosphere and cooled at 5° C. with an ice bath. 213.4 grams of acrylonitrile was added dropwise, with continuous stirring, at a rate to maintain the temperature of the reagents below 30° C. After standing overnight, the reaction product was a water-white liquid weighing 655 grams having a refractive index at 25° C. of 1.4331. A portion of this material, i.e., 327.4 grams, was distilled through a Vigreaux column under reduced pressure. Three fractions were isolated possessing the following characteristics: (1) 30.4 grams; boiling range, 119°C.–132° C. at 0.7 mm. of Hg; $n_D{}^{25}=1.4350$; (2) 210.6 grams; boiling range, 127° C.–132° C. at 0.6–0.7 mm. of Hg; $n_D{}^{25}=1.4351$; (3) 10.5 grams; boiling range 122° C.–128° C. at 0.65 mm. of Hg; $n_D{}^{25}=1.4351$. Fraction (2) above was further identified as gamma-(N-2-cyanoethyl)aminopropyltriethoxysilane, $(CH_5O)_3Si(CH_2)_3NH(CH_2)_2CN$ as follows:

Analysis for $C_{12}H_{26}SiN_2O_3$.—Calculated: N, 5.1 (by titration). Found: N, 5.1 (by titration).

Infrared analysis confirmed the presence of bands due to $-NH-$, $-CH_3$, $-CH_2-$, $\equiv SiOC_2H_5$, and $-C\equiv N$ (non-conjugated) groups.

EXAMPLE V

*Reaction of Delta-Aminobutyltriethoxysilane With Acrylonitrile*

Employing the equipment set forth in Example I there was charged 282.2 grams of delta-amionbutyltriethoxysilane and 66.3 grams of acrylonitrile; the resulting mixture was continuously stirred at room temperature for 1 hour. The infrared spectrum of the reaction product disclosed absorption due to $-NH-$, $-C\equiv N$, and $\equiv SiOC_2H_5$ groups. No $-C=C-$ band was observed. The reaction product was subsequently distilled through a Vigreaux column under reduced pressure wherein three fractions were obtained. The first fraction amounted to 74.6 grams having a boiling range from 56° C.–127° C. at a pressure of 0.4–0.5 mm. of Hg; the refractive index at 25° C. was 1.4238–1.4352. A second fraction amounted to 212.1 grams with a boiling range of 128° C. at a pressure of 0.3–0.4 mm. of Hg; $n_D{}^{25}=1.4370$. This fraction was shown to be delta-(N-2-cyanoethyl)aminobutyltriethoxysilane, $(C_2H_5)_3Si(CH_2)_4NH(CH_2)_2CN$.

Microanalysis for $C_{13}H_{28}SiN_2O_3$.—Calculated: C, 54.1; H, 9.8; Si, 9.8; N, 9.7. Found: C, 52.5; H, 10.4; Si, 10.0; N, 9.7.

The infrared analysis showed this material to possess $-NH-$ bands; no $-NH_2$ bands were observed.

19.6 grams of a third fraction was isolated having a boiling range of 172° C.–210° C. at 0.52–0.98 mm. of Hg; the refractive index at 25° C. was 1.4484. This material was further shown to be delta-(N,N-di-2-cyanoethyl)-aminobutyltriethoxysilane

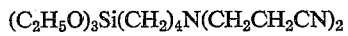

Analysis for $C_{16}H_{31}SiN_3O_3$.—Calculated: C, 56.4; H, 9.1; Si, 8.2; N, 12.2. Found: C, 54.9; H, 9.4; Si, 9.4; N, 11.7.

The infrared spectrum showed strong $-C\equiv N$ bands and no $-NH-$ bands.

EXAMPLE VI

*Reaction of Delta-Aminobutylmethyldiethoxysilane With Acrylonitrile*

A 100 ml. flask equipped as described in Example IV was charged with 205.3 grams of delta-aminobutylmethyldiethoxysilane. 106.2 grams of acrylonitrile was added dropwise with constant stirring of the solution. During the dropwise addition the temperature rose from 25° C. to 48° C., and at the latter temperature the solution was stirred for an additional 2 hours. Upon allowing the solution to stand for 2 days at room temperature, the resulting reaction product was distilled through a Vigreaux column under reduced pressure. Three fractions were obtained, namely, (1) 50.7 grams with a boiling range of 64° C.–115° C. at a pressure of 0.90 mm. of Hg; $n_D^{25}=1.4209$–1.4210); (2) 165.9 grams with a boiling point of 115° C.–116° C. at 0.90 mm. of Hg pressure; $n_D^{25}=1.4423$; and (3) 9.7 grams with a boiling point of 183° C.–184° C. at 0.89 mm. of Hg pressure;

$$n_D^{25}=1.4518$$

Fraction (2) above was further identified as delta-(N-2-cyanoethyl)aminobutylmethyldiethoxysilane,

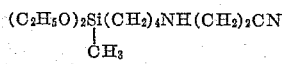

Microanalysis for $C_{12}H_{26}SiN_2O_2$.—Calculated: C, 55.8; H, 10.1; N, 10.8; Si, 10.9. Found: C, 54.1; H, 10.8; N, 10.9; Si, 10.7.

The infrared spectrum confirmed the presence of —NH—, —C≡N, ≡SiCH₃, and ≡SiOC₂H₅ groups. No evidence of —C=C— bands were present.

Fraction (3) above was shown to be delta-(N,N-di-2-cyanoethyl)aminobutylmethyldiethoxysilane,

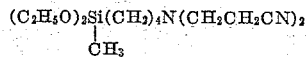

Analysis for $C_{15}H_{29}SiN_3O_2$.—Calculated: C, 57.8; H, 9.4; N, 13.5; Si, 9.0. Found: C, 56.1; H, 10.9; N, 12.2; Si, 10.2.

EXAMPLE VII

*Reaction of Delta-Aminobutylmethyldiethoxysilane With Ethyl Cinnamate*

To the equipment described in Example I there were charged 102.7 grams of delta-aminobutylmethyldiethoxysilane and 88.1 grams of ethyl cinnamate. The resulting mixture was stirred for 1 hour at room temperature and allowed to stand overnight. On heating this mixture to 180° C. an orange color developed. Employing a Vigreaux column under reduced pressure a 10.7 grams fraction of delta-(N-1-phenyl-2-carbethoxyethyl)aminobutylmethyldiethoxysilane, having a boiling range of 152° C.–162° C. at 0.5 mm. of Hg and refractive index at 25° C. of 1.4776 was obtained.

Analysis for $C_{20}H_{35}SiNO_4$.—Calculated: C, 63.0; H, 9.2; Si, 7.4; N, 3.7. Found: C, 62.4; H, 10.4; Si, 8.1; N, 4.0.

The structure of the product was further confirmed by infrared analysis and identified as:

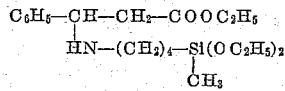

EXAMPLE VIII

*Reaction of Delta-Aminobutylmethylsilicone Cyclic Tetramer With Diethyl Maleate*

To the equipment set forth in Example I there was charged 102.7 grams of delta-aminobutylmethylsilicone cyclic tetramer and 86.1 grams of diethyl maleate. The temperature of the reaction mixture rose to 85° C. The reaction product could not be distilled, but was stripped under 1.0 mm. pressure up to 150° C. until 20.0 grams of distillate was collected in the cold trap. The residue, a viscous oil, was identified as the cyclic tetramer of delta-(N-1,2-dicarbethoxyethyl)aminobutylmethylsiloxane,

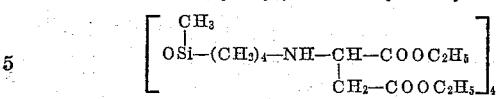

Analysis for the delta-(N-1,2-dicarbethoxyethyl)aminobutylmethylsiloxane unit.—Calculated: C, 51.5; H, 8.3; Si, 9.3; N, 4.5. Found: C, 48.3; H, 10.3; Si, 13.2; N, 6.3.

The infrared spectrum confirmed the presence of strong bands due to —NH—,

ester, ≡Si—O—Si≡ cyclic and ≡SiCH₃ groups.

EXAMPLE IX

*Reaction of Dimethylsilicone Oil (1,000 M.W.) Modified With 10 Weight Percent Delta-Aminobutylmethylsiloxy Units With Methyl Acrylate*

To a 500 cc. flask there were charged 100 grams of a trimethylsiloxy end-blocked dimethylsiloxane oil (M.W. 1,000) containing 10 weight percent delta-aminobutylmethylsiloxy units and 6.55 grams of methyl acrylate. The mixture was allowed to stand overnight. The resulting oil, a trimethylsiloxy end-block dimethylsiloxane oil containing delta-(N-2-carbomethoxyethyl)aminobutylmethylsiloxane units had a refractive index at 25° C. of 1.4094. The infrared spectrum confirmed the presence of —NH—, linear ≡SiOSi≡, ≡Si(CH₃)₂, and $$-Si(CH_3)_3$$

groups.

EXAMPLE X

*Reaction of a Dimethylsilicone Oil (M.W. 1,000) Containing 10 Weight Percent Delta-Aminobutylmethylsiloxy Units With Ethyl Acrylate*

Utilizing the equipment described in Example I there were charged 200 grams of a 1,000 M.W. trimethylsiloxy end-blocked dimethylsilicone oil cointaining 10 weight percent delta-aminobutylmethylsiloxy units and 22.2 grams of ethyl acrylate. The mixture was stirred for 1 hour at a maximum temperature of 110° C. The product oil was then sparged under reduced pressure to a pot temperature of 100° C. The product, a trimethylsiloxy end-blocked dimethylsiloxane oil containing gamma-(N-2-carbethoxyethyl)aminobutylmethylsiloxane units, had a viscosity of 40 centipoises and a refractive index at 25° C. of 1.4122.

Microanalysis.—Percent nitrogen determined by titration: Calculated: N, 1.27. Found: N, 1.29.

The infrared analysis confirmed the presence of linear ≡SiOSi≡,

ester, and —NH— groups. The oil was soluble in ethanol and benzene and insoluble in water.

EXAMPLE XI

*Reduction of $(C_2H_5O)_3Si(CH_2)_4NH(CH_2)_2CN$ to Prepare $(C_2H_5O)_3Si(CH_2)_4NH(CH_2)_3NH_2$*

To a 300 cc. steel rocking autoclave there was charged 145 grams of $(C_2H_5O)_3Si(CH_2)_4NH(CH_2)_2CN$ (prepared in Example V), followed by flushing the autoclave with argon. 8 grams of Raney nickel was then added and ammonia was introduced until the pressure was 100 p.s.i. The introduction of hydrogen at 25° C. raised the pressure of the autoclave to 1500 p.s.i., and the vessel was heated to 120° C. for a period of 5 hours. The reaction was carried out over a period of 17 hours. The total pressure drop of hydrogen was 2120 p.s.i. The vessel was then cooled at 25° C.; the pressure was 700 p.s.i., and the contents were examined. Since reduction was incomplete (determined by titration of the product with standard HCl), the liquid reaction product was filtered, 8.0 grams of bis(cyclopentadienyl) nickel was added and the above reduction step was repeated, i.e., ammonia (100 p.s.i.) and hydrogen (total pressure of 1500 p.s.i.) were added as above and the vessel was heated at 132° C. for 2 hours and at 142° C. for 18 hours. A brown liquid product was obtained and filtered. An attempt to distill this product at reduced pressure disclosed evidence of dissociation, consequently, the product was stripped under a pressure of 1.0 mm. of Hg and employing a pot temperature up to 165° C. The stripped brown liquid product was delta-(N-3-aminopropyl)aminobutyltriethoxysilane $(C_2H_5O)_3Si(CH_2)_4NH(CH_2)_3NH_2$.

Analysis for $C_{13}H_{32}SiN_2O_3$.—Calculated: C, 53.4; H, 11.0; Si, 9.6; N, 9.6. Found: C, 53.2; H, 11.1; Si, 10.4; N, 9.5 (titrated).

EXAMPLE XII

Reduction of

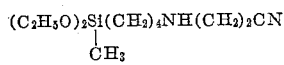

to Yield

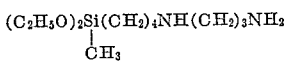

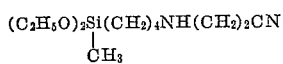

was reduced in a manner similar to that described in Example XI using a 75.0 gram charge. 75 cc. of ethanol was employed as a solvent, and ammonia added until the autoclave pressure was 250 p.s.i. at 250° C. 8.0 grams of Raney nickel was used as the catalyst. The reduction was carried out at a temperature of 130° C.–132° C. for a period of 15 hours. The product was removed from the autoclave and stripped under a reduced pressure of 1.0 mm. of Hg and a maximum pot temperature of 100° C. The residue delta-(N-3-aminopropyl)aminobutylmethyldiethoxysilane, weighed 55.5 grams.

Analysis for $C_{12}H_{30}SiN_2O_2$.—Calculated: C, 54.9; H, 11.5; Si, 10.7; N, 10.7. Found: C, 53.2; H, 12.9; Si, 12.2; N, 10.0.

The infrared spectrum confirmed the presence of $-NH_2$, $\equiv SiCH_3$, and $\equiv SiOC_2H_5$ groups. No $-C\equiv N$ bands were observed.

EXAMPLE XIII

Hydrolysis of $(C_2H_5O)_3Si(CH_2)_3NH(CH_2)_2COOCH_3$ to Yield $O_{3/2}Si(CH_2)_3NH(CH_2)_2COOCH_3$ To a 100 ml. flask there was charged 32.0 grams of $(C_2H_5O)_3Si(CH_2)_3NH(CH_2)_2COOCH_3$. This material was cooled in an ice bath and a mixture of 18 grams of water and 15 ml. of concentrated hydrochloric acid was added with stirring being effected by a stream of argon gas passing through the resulting solution. The temperature was not permitted to exceed 33° C. Water and alcohol were stripped from the liquid product by employing a pot temperature up to 100° C. (hot water bath) at a pressure of 1–5 mm. of Hg for a period of 2 hours. The white resin product, gamma-(N-2-carbomethoxyethyl)aminopropylpolysiloxane, weighed 24.7 grams.

EXAMPLE XIV

Hydrolysis of

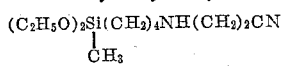

to Prepare

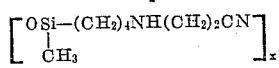

To a 200 cc. flask there was charged 75.0 grams of

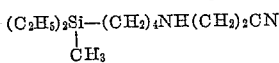

36 ml. of water was then added with swirling of contents in the flask. The resulting mixture was not homogenous, and no heat effect was noted on mixing. The mixture was heated to reflux temperature for 1 hour during which period the contents became a homogeneous, colorless liquid. The liquid product was stripped up to a pot temperature of 205° C. under an argon atmosphere, yielding a pale yellow homogeneous oil residue. The residue was further stripped at a pot temperature up to 149° C. for a period of 25 minutes yielding 53.5 grams of delta-(N-2-cyanoethyl)aminobutylmethylpolysiloxane, a pale yellow liquid possessing the following characteristics: $n_D^{25}=1.4772$; viscosity of 1810 centipoises at 25° C., M.W.=2300.

Microanalysis for $C_8H_{16}SiH_2O$.—Calculated: Si, 15.2; N, 7.6 (titration). Found: Si, 15.1; N, 7.4.

The infrared analysis of this material confirmed the presence of $-NH-$, $-C\equiv N$, $\equiv SiCH_3$, $\equiv SiOSi\equiv$, and $\equiv Si(CH_2)_4-$ groups.

EXAMPLE XV

Preparation of a Dimethylsilicone Oil (M.W.=5,000) Containing 10 Weight Percent

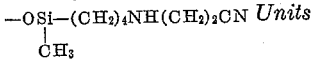

Units

To the equipment described in Example I there were charged 30.0 grams of

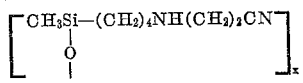

(prepared in Example XIV), 247.0 grams of dimethylsiloxane cyclic tetramer, and 23.0 grams of

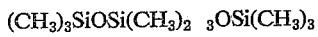

$(CH_3)_3SiOSi(CH_3)_2\ _3OSi(CH_3)_3$

This mixture was heated to 158° C., with stirring, and 30 drops of potassium silanolate (containing 70 p.p.m. of K) catalyst were added. The homogeneous solution was allowed to stand overnight at 158° C. The contents were then cooled below 100° C. and 6 drops of acetic acid were added, followed by stirring for 10 minutes and sparging under an argon atmosphere at a temperature in the range of 120° C.–140° C., a pressure of 5.0 mm. of Hg, and a period of time of 2 hours. The product, a trimethylsiloxy end-blocked dimethylpolysiloxane oil containing delta-(N-2-cyanoethyl)aminobutylmethylsiloxane units, a light yellow oil, weighed 275 grams, possessed a viscosity of 103.7 cs., and a viscosity temperature index of 0.653.

Microanalysis for percent: Calculated: N, 0.83. Found: N, 0.94 (titration).

EXAMPLE XVI

Reaction of $(C_2H_5O)_3Si(CH_2)_3NH(CH_2)_2COOC_2H_5$ With Silica Gel to Form a Silicone Chelating Resin Silica gel, 150 cc., of 6 mesh size was slurried in 350 cc. of water until it crumbled to about 60 mesh size, followed by drying at 110° C. for 1 hour. The silica gel (60 mesh) was then placed into a 500 cc. flask equipped with condenser and stirrer, and 160 cc. of toluene containing 10 grams of $(C_2H_5O)_3Si(CH_2)_3NH(CH_2)_2COOC_2H_5$ was added thereto. The mixture was stirred and heated to a temperature from about 90° C.–100° C. for 15 minutes. The product was then cooled, filtered, washed with petroleum ether, and heated in an air oven at 110° C. for 1 hour. Titration with standard HCl showed that 85% of the silane had been absorbed by the silica gel. 98 grams of the treated silica gel was then charged to a vessel containing 125 cc. of water and 0.1–0.2 gram of potassium hydroxide and stirred at 90° C. for 1 hour. The contents were allowed to stand overnight at room temperature. The treated silica gel was recovered by washing with water and acetone and briefly dried by air. 60 grams of this material was placed in a vertical glass column, 1" diameter x 24" length, and water was added thereto. 5 cc.

of 0.1 N aqueous cupric acetate was passed slowly into the column followed by a large amount of water. The copper was adsorbed and formed a blue zone on the silica gel-silicone packing. Continued washings with water did not remove the copper. Adsorption was quantitative since the ammonia test did not detect any copper in the elutriant. The blue color was most intense near the top of the column. Concentrated acetic acid was then passed through the column quantitatively removing copper from the silica gel-silicone packing to give a blue elutriant. The column was then washed with water until the elutriant was barely acidic as determined by litmus paper. Aqueous cupric acetate was again added to the column in the same quantity as above and the procedure was repeated. Copper adsorption on the silica gel was again quantitative.

As a control, a column packed solely with silica gel was treated with aqueous cupric acetate under the same conditions as described above for the silicone-treated silica gel. The copper was not adsorbed.

5 cc. of 0.1 N aqueous nickel acetate was passed into a column containing silicone-treated silica gel under conditions similar to those used for the adsorption of copper above. Adsorption of nickel was quantitative, and repeated washings with water did not disclose the presence of nickel in the elutriant.

EXAMPLE XVII

*Flocculation of Clay by $NH_2(CH_2)_3NH(CH_2)_4Si(OC_2H_5)_3$ and $C_2H_5OOC(CH_2)_2NH(CH_2)_3Si(OC_2H_5)_3$*

The compounds $NH_2(CH_2)_3NH(CH_2)_4Si(OC_2H_5)_3$ (I) and $C_2H_5OOC(CH_2)_2NH(CH_2)_3Si(OC_2H_5)_3$ (II) were tested as flocculating, or depeptizing, agents for clay in the following manner: To a test tube there were added 10 cc. of water, 0.3 gram of a brown clay, and compound (I) above. The test tube was vigorously shaken and the clay allowed to settle. The procedure was repeated for compound (II) above. A control sample, i.e., no added silicone compound, was run simultaneously. Effectiveness of the additive was judged by both the degree of flocculation and the rapidity of settling of the clay particles. The tests showed that compound (I) effectively flocculated the clay particles and increased the rate of settling of the particles over that of the control sample. Compound (II) was not as outstanding as compound (I), but compound (II) disclosed suitable flocculating properties.

EXAMPLE XVIII

*Preparation of $(C_2H_5O)_3Si(CH_2)_3NH(CH_2)_3NH_2$*

Gamma-(N-2-cyanoethyl)-aminopropyltriethoxysilane is reduced by charging the compound (75 grams) and 75 cc. of ethanol, together with a small amount of Raney nickel, to an autoclave and adding ammonia thereto until a pressure of about 100 p.s.i. is reached and introducing hydrogen into the autoclave until a pressure of about 1500 p.s.i. is reached. The contents in the autoclave are heated to a temperature of 125° C. for a period of several hours (20 hours), cooled and the contents removed, filtered and stripped. The product is gamma-(N-3-aminopropyl)aminopropyltriethoxysilane. On hydrolysis gamma-(N-3-aminopropyl)aminopropylpolysiloxane is obtained.

By following this procedure delta-(N,N-di-2-cyanoethyl) aminobutyltriethoxysilane (Example V) is reduced to delta-(N,N-di-3-aminopropyl)aminobutyltriethoxysilane.

EXAMPLE XIX

*Preparation of $(C_2H_5O)_3Si(CH_2)_3NH(CH_2)_3NH_2$*

Equal molar amounts (3 mols) of ethylenediamine and gamma-chloropropyltriethoxysilane were reacted under an inert atmosphere (argon). The reaction was carried out by adding a portion of the gamma-chloropropyltriethoxysilane to ethylenediamine at room temperature and by adding the remaining amount of the silane while the reaction mixture was heated to its boiling point under conditions of reflux. After the addition of all the silane the mixture was allowed to reflux for a period of about five (5) hours after which it was cooled to room temperature. The mixture settled out into two phases. The upper phase, which was light amber in color, was filtered and distilled under a reduced pressure of 6–8 mm. Hg and at a temperature of 112 to 120° C. The product obtained had a refractive index $N_D$ at 25° C. of 1.4360 and was identified by infrared and nuclear magnetic resonance analyses as gamma-(N-2-aminoethyl)aminopropyltriethoxysilane. Analysis for nitrogen and silicon content of the product was as follows:

| | Calculated | Found |
| --- | --- | --- |
| Nitrogen | 10.6 | 10.4 |
| Silicon | 10.6 | 10.6 |

EXAMPLE XX

*Preparation of*

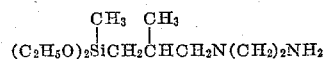

By following the procedure of Example XIX with gamma-aminopropylmethyldiethoxysilane employed as the starting aminoalkyl silicon compound, the product obtained is gamma-(N-2-aminoethyl)aminopropylmethyldiethoxysilane, which upon hydrolysis forms polymers which contain the repeating gamma-(N-2-aminoethyl)aminopropylmethylsiloxane unit. Equilibration of this polymer with the cyclic tetramer of dimethylsiloxane yields a polymer containing gamma-(N-2-aminoethyl)aminopropylmethylsiloxane units and dimethylsiloxane units.

EXAMPLE XXI

*Preparation of*

$(C_2H_5O)_2SiCH_2\overset{CH_3}{\underset{}{C}}H\overset{CH_3}{\underset{}{C}}H_2N(CH_2)_2NH_2$ When equal molar amounts of 1-chloro-2-bromoethane and gamma-aminoisobutylmethyldiethoxysilane are mixed together with tributylamine (hydrogen bromide acceptor), heated to a temperature of about 150° C. for a period of five (5) hours, the product comprises a mixture of materials including the hydrobromide of the amine acceptor and gamma-(N-2-chloroethyl)aminoisobutylmethyldiethoxysilane. Some unreacted starting materials are present together with a small amount of gamma-(N-2-bromoethyl)aminoisobutylmethyldiethoxysilane. The reaction of the amino group of our starting silane with the bromine atom of the starting substituted ethane proceeds at a faster rate than its reaction with the chlorine atom of the substituted ethane. Gamma-(N-2-chloroethyl)aminoisobutylmethyldiethoxysilane can be distilled from the reaction mixture, after the solid by-products present have been filtered therefrom, and reacted with ammonia. The reaction with ammonia is carried out in a closed vessel using a large molar excess of ammonia and heating to a temperature of 160° C. for a period of ten (10) hours. Gamma - (N - 2 - aminoethyl)aminoisobutylmethyldiethoxysilane is recovered from the reaction product by first removing the solid by-products therein through a filtering procedure and by a subsequent distillation procedure. The compound boils at a temperature of 101–104° C. under a reduced pressure of 0.35 mm. Hg.

This application is a continuation-in-part application of application Serial No. 615,480, filed October 12, 1956.

What is claimed is:

1. Organosilicon compounds selected from the class consisting of silanes represented by the formula:

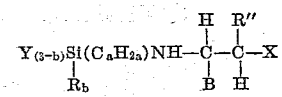

wherein R represents a member selected from the class consisting of alkyl groups and aryl groups; Y represents a member selected from the class consisting of alkoxy groups; B represents a member selected from the class consisting of hydrogen, alkyl groups, aryl groups and X; X represents an organic functional group selected from the class consisting of a nitrile group and a substituted carbonyl group as represented by the formula:

wherein D represents a member selected from the class consisting of hydrogen, alkyl groups, aryl groups, alkoxy groups, aryloxy groups and amino groups; R'' represents a member selected from the class consisting of hydrogen and alkyl groups; $b$ is an integer having a value of from 0 to 2; $a$ is an integer having a value of at least 3 and wherein the secondary amino nitrogen is removed from silicon by at least three carbon atoms.

2. Organosilicon compounds selected from the class consisting of silanes represented by the formula:

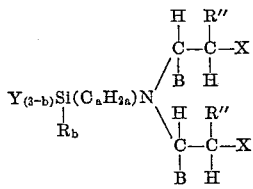

wherein R represents a member selected from the class consisting of alkyl groups and aryl groups; Y represents a member selected from the class consisting of alkoxy groups; B represents a member selected from the group consisting of hydrogen, alkyl groups, aryl groups and X; X represents an organic functional group selected from the class consisting of a nitrile group, and a substituted carbonyl group as represented by the formula:

wherein D represents a member selected from the class consisting of hydrogen, alkyl groups, aryl groups, alkoxy groups, aryloxy groups and amino groups; R'' represents a member selected from the group consisting of hydrogen and alkyl radicals; $b$ is an integer having a value of from 0 to 2; $a$ is an integer having a value of at least 3 and wherein the tertiary amino nitrogen atom is removed from silicon by at least three carbon atoms.

3. Organosilicon compounds selected from the class consisting of siloxane polymers and siloxane copolymers containing units represented by the formula:

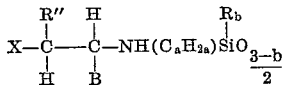

wherein R represents a member selected from the class consisting of alkyl groups and aryl groups; B represents a member selected from the class consisting of hydrogen, alkyl groups, aryl groups and X; X represents an organic functional group selected from the class consisting of a nitrile group and a substituted carbonyl group as represented by the formula:

wherein D represents a member selected from the class consisting of hydrogen, alkyl groups, aryl groups, alkoxy groups, aryloxy groups and amino groups; R'' represents a member selected from the class consisting of hydrogen and alkyl groups; $b$ is an integer having a value of from 0 to 2; $a$ is an integer having a value of at least 3 and wherein the secondary amino nitrogen atom is removed from silicon by at least three carbon atoms.

4. Organosilicon compounds selected from the class consisting of siloxane polymers and siloxane copolymers containing units represented by the formula:

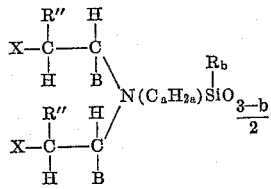

wherein R represents a member selected from the class consisting of alkyl groups and aryl groups; B represents a member selected from the class consisting of hydrogen, alkyl groups, aryl groups and X; X represents an organic functional group selected from the class consisting of a nitrile group, and substituted carbonyl groups as represented by the formula:

wherein D represents a member selected from the class consisting of hydrogen, alkyl groups, aryl groups, alkoxy groups, aryloxy groups and amino groups; R'' represents a member selected from the class consisting of hydrogen and alkyl groups; $b$ is an integer having a value of from 0 to 2; $a$ is an integer having a value of at least 3 and wherein the tertiary amino nitrogen atom is removed from silicon by at least three carbon atoms.

5. Gamma-(N-2-carbomethoxyethyl)-aminopropyltriethoxysilane.

6. Gamma-(N,N-di-2-carbomethoxyethyl) - amino-propyltriethoxysilane.

7. Gamma - (N - 2 - carbethoxyethyl) - aminopropyltriethoxysilane.

8. Gamma-(N,N-di-2-carbethoxyethyl)-aminopropyltriethoxysilane.

9. Gamma - (N-2-amidoethyl)-aminopropyltriethoxysilane.

10. Gamma - (N-2-cyanoethyl)-aminopropyltriethoxysilane.

11. Delta-(N-2-cyanoethyl)-aminobutyltriethoxysilane.

12. Delta-(N,N-di-2-cyanoethyl)-aminobutyltriethoxysilane.

13. Delta-(N-2-cyanoethyl)-aminobutylmethyldiethoxysilane.

14. Delta-(N,N-di-2-cyanoethyl) - aminobutylmethyldiethoxysilane.

15. Delta-(N-1-phenyl-2-carbethoxyethyl)-aminobutylmethyldiethoxysilane.

16. The cyclic tetramer of delta-(N-1,2-dicarbethoxyethyl)-aminobutylmethylsiloxane.

17. A trimethylsiloxy end-blocked dimethylsiloxane oil containing delta-(N-2-carbomethoxyethyl)-aminobutylmethylsiloxane units.

18. A trimethylsiloxy end-blocked dimethylsiloxane oil containing delta-(N-2-carboethoxyethyl) - aminobutylmethylsiloxane units.

19. Delta-(N-3-aminopropyl) - aminobutyltriethoxysilane.

20. Delta-(N-3-aminopropyl) - aminobutylmethyldiethoxysilane.

21. Gamma-(N-2-carbomethoxyethyl) - aminopropylpolysiloxane.

22. Delta-(N-2-cyanoethyl) - aminobutylmethylpolysiloxane.

23. A trimethylsiloxy end-blocked dimethylsiloxane oil containing delta-(N-2-cyanoethyl) - aminobutylmethylsiloxane units.

24. Process for producing organosilicon compounds which comprises reacting
(1) an aminoalkylsilicon compound which contains at least one group of the formula:

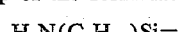

wherein $a$ is an integer having a value of at least 3 and wherein the nitrogen atom is removed from silicon by at least three carbon atoms, the silicon atom is connected to at least one member of the class consisting of an alkoxy group and silicon through silicon to oxygen to silicon linkage and any remaining unfilled valences of the silicon atom of said formula being satisfied by a member selected from the class consisting of alkyl and aryl radicals; with (2) an alpha-beta unsaturated organic compound having the formula:

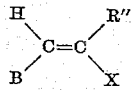

wherein B is a member selected from the class consisting of hydrogen, alkyl, aryl and X, R" is a member of the class consisting of hydrogen and alkyl groups and X is a member of the class consisting of the nitrile group, and a carbonyl group of the formula:

wherein D is a member selected from the class consisting of hydrogen, alkyl, aryl, alkoxy, aryloxy and amino groups; to form a member selected from the class consisting of organosilicon compounds having at least one group of the formula:

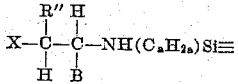

and organosilicon compounds having at least one group of the formula:

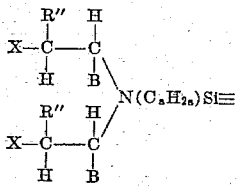

wherein $a$, B, X, R" are as defined above; and each silicon atom is connected and each unfilled valence of each silicon atom is satisfied as defined above.

25. Process for the production of organosilicon compounds which comprises reacting an aminoalkylsilane represented by the formula:

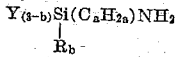

wherein R represents a member selected from the class consisting of alkyl radicals and aryl radicals; Y represents an alkoxy radical; $a$ is an integer having a value of at least 3 and wherein the nitrogen atom is removed from silicon by at least three carbon atoms; and $b$ is an integer having a value of from 0 to 2; with an alpha-beta olefinically unsaturated compound represented by the formula:

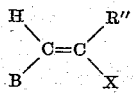

wherein B represents a member selected from the class consisting of hydrogen, alkyl, aryl and X; X represents an organic functional group selected from the class consisting of a nitrile group and a carbonyl group of the formula:

wherein D represents a member selected from the class consisting of hydrogen, alkyl, aryl, alkoxy, aryloxy and amino groups; R" represents a member selected from the group consisting of hydrogen and alkyl groups; to form a member selected from the class consisting of organosilicon compounds represented by the formula:

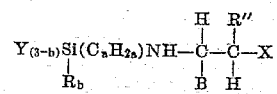

and an organosilicon compound represented by the formula:

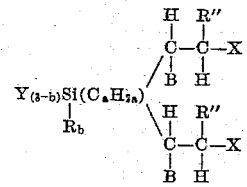

wherein Y, R, R", X, B, $a$ and $b$ are as defined above.

26. Process for the production of organosilicon compounds which comprises reacting an aminoalkylsiloxane from the group consisting of siloxane polymers and siloxane copolymers containing at least one unit represented by the formula:

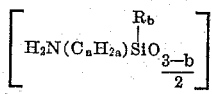

wherein R represents a member selected from the class consisting of alkyl and aryl groups, $a$ is an integer of at least 3 and wherein the nitrogen atom is removed from silicon by at least three carbon atoms; $b$ is an integer of from 0 through 2; with an alpha-beta olefinically unsaturated compound represented by the formula:

wherein B represents a member selected from the class consisting of hydrogen, alkyl, aryl and X; X represents an organic functional group selected from the class consisting of a nitrile group and a carbonyl group of the formula:

wherein D represents a member selected from the class consisting of hydrogen, alkyl, aryl, alkoxy, aryloxy and amino groups; and R" represents a member selected from the class consisting of hydrogen and alkyl groups; to form a member from the class consisting of siloxane polymers and siloxane copolymers containing at least one unit selected from the class consisting of units represented by the formula:

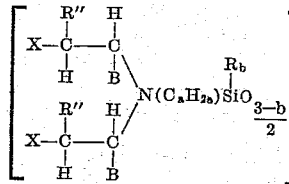

and units represented by the formula:

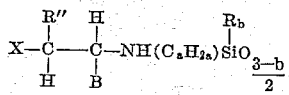

wherein R, R", X, B, $a$ and $b$ are as defined above.

27. Process as claimed in claim 25 wherein the aminoalkylsilane is gamma-aminopropyltriethoxysilane, the alpha-beta olefinically unsaturated compound is acrylamide and the organosilicon compound formed is gamma-(N-2-amidoethyl)aminopropyltriethoxysilane.

28. Process as claimed in claim 25 wherein the aminoalkylsilane is gamma-aminopropyltriethoxysilane, the alpha-beta olefinically unsaturated compound is acrylonitrile and the organosilicon compound formed is gamma-(N-2-cyanoethyl)aminopropyltriethoxysilane.

29. Organosilicon compounds selected from the class consisting of alkoxysilanes and siloxane polymers and siloxane copolymers containing at least one (1) unit of the formula:

$$H_2N(C_aH_{2a})Si\equiv$$

wherein $a$ is an integer having a value of at least 3 and wherein the nitrogen atom is removed from silicon by at least three (3) carbon atoms and wherein at least one of the nitrogen-bonded hydrogen atoms is replaced by a beta-functional ethyl group selected from the class consisting of beta-cyanoethyl, beta-carbalkoxyethyl, beta-carbaryloxyethyl, beta-amidoethyl, beta-aminoethyl, beta-formylethyl, beta-alkylcarbonylethyl and beta-arylcarbonylethyl and wherein the silicon atom of said unit is connected to at least one (1) member selected from the class consisting of alkoxy and silicon through silicon to oxygen to silicon linkage and from 0 to 2 of the remaining valences of the silicon atom of said unit are satsified by a member selected from the class consisting of alkyl and aryl groups.

30. Organosilicon compounds selected from the class consisting of alkoxysilanes and siloxane polymers and siloxane copolymers containing at least one (1) unit of the formula:

$$H_2N(C_eH_{2e})\overset{H}{\underset{|}{N}}(C_aH_{2a})Si\equiv$$

wherein $a$ is an integer of at least 3 and wherein the secondary amino nitrogen atom is removed from silicon by at least three (3) carbon atoms, $e$ is an integer having a value of at least two (2) and wherein the primary amino group is removed by at least two (2) carbon atoms from the $H_2N(C_eH_{2e})$ substituted nitrogen atom, wherein the silicon atom of said unit is connected to at least one (1) member selected from the class consisting of alkoxy and silicon through silicon to oxygen to silicon linkage and from 0 to 2 of the remaining valences of the silicon atom of said unit are satisfied by a member selected from the class consisting of alkyl and aryl groups.

31. The organosilicon compound of claim 30 wherein $a$ has a value of 4, $e$ has a value of 2 and one valence of the silicon atom is bonded to a methyl group and the remaining two valences of the silicon atom are connected to silicon atoms through silicon to oxygen to silicon linkages, said organosilicon compound containing at least one dimethylsiloxane unit.

32. The organosilicon compound of claim 30 wherein $a$ has a value of 4, $e$ has a value of 3 and one valence of the silicon atom is bonded to a methyl group and the remaining two valences of the silicon atom are connected to silicon atoms through silicon to oxygen to silicon linkages, said organosilicon compound containing at least one dimethylsiloxane unit.

33. Alkoxysilanes of the formula:

$$H_2N(C_aH_{2a})Si\equiv$$

wherein $a$ is an integer having a value of at least 3 and wherein the nitrogen atom is removed from silicon by at least three (3) carbon atoms and wherein at least one of the nitrogen-bonded hydrogen atoms is replaced by a beta-functional ethyl group selected from the class consisting of beta-cyanoethyl, beta-carbalkoxyethyl, beta-carbaryloxyethyl, beta-amidoethyl, beta-aminoethyl, beta-formylethyl, beta-alkylcarbonylethyl and beta-arylcarbonylethyl and wherein the silicon atom of said unit is connected to at least one (1) alkoxy group and any remaining valences of the silicon atom of said unit are satisfied by a member selected from the class consisting of alkyl and aryl groups.

34. Siloxane polymers which consist essentially of units of the formula:

$$H_2N(C_aH_{2a})Si\equiv$$

wherein $a$ is an integer having a value of at least 3 and wherein the nitrogen atom is removed from silicon by at least three (3) carbon atoms and wherein at least one of the nitrogen-bonded hydrogen atoms is replaced by a beta-functional ethyl group selected from the class consisting of beta-cyanoethyl, beta-carbalkoxyethyl, beta-carbaryloxyethyl, beta-amidoethyl, beta-aminoethyl, beta-formylethyl, beta-alkylcarbonylethyl and beta-arylcarbonylethyl and wherein the silicon atom of said unit is connected to at least one (1) silicon atom of said unit is connected to at least one (1) silicon atom through silicon to oxygen to silicon linkage and any remaining valences of the silicon atom of said unit are satisfied by a member selected from the class consisting of alkyl and aryl groups.

35. Alkoxysilanes of the formula:

$$H_2N(C_eH_{2e})\overset{H}{\underset{|}{N}}(C_aH_{2a})Si\equiv$$

wherein $a$ is an integer of at least 3 and wherein the secondary amino nitrogen atom is removed from silicon by at least three (3) carbon atoms, $e$ is an integer having a value of at least two (2) and wherein the primary amino group is removed by at least two (2) carbon atoms from the $H_2N(C_eH_{2e})$ substituted nitrogen atom, wherein the silicon atom of said unit is connected to at least one alkoxy group and any remaining valences of the silicon atom of said unit are satisfied by a member selected from the class consisting of alkyl and aryl groups.

36. Siloxane polymers which consist essentially of units of the formula:

$$H_2N(C_eH_{2e})\overset{H}{\underset{|}{N}}(C_aH_{2a})Si\equiv$$

wherein $a$ is an integer of at least 3 and wherein the secondary amino nitrogen atom is removed from silicon by at least three (3) carbon atoms, $e$ is an integer having a value of at least two (2) and wherein the primary amino group is removed by at least two (2) carbon atoms from the $H_2N(C_eH_{2e})$ substituted nitrogen atom, wherein the silicon atom of said unit is connected to at least one (1) atom through silicon to oxygen to silicon linkage and any remaining valences of the silicon atom of said unit are satisfied by a member selected from the class consisting of alkyl and aryl groups.

References Cited in the file of this patent

UNITED STATES PATENTS 2,754,311    Elliot _____ July 10, 1956

UNITED STATES PATENT OFFICE
CERTIFICATE OF CORRECTION

Patent No. 3,033,815                            May 8, 1962

Ronald M. Pike et al.

It is hereby certified that error appears in the above numbered patent requiring correction and that the said Letters Patent should read as corrected below.

Column 22, line 54, after "(1)" insert -- silicon --.

Signed and sealed this 31st day of December 1963.

(SEAL)
Attest:
ERNEST W. SWIDER

Attesting Officer

EDWIN L. REYNOLDS

Acting Commissioner of Patents